United States Patent
Kobayashi (10) Patent No.: US 8,961,025 B1
(45) Date of Patent: Feb. 24, 2015

(54) ATTACHING STRUCTURE OF BEARING TO SHAFT

(71) Applicant: Nippon Pillow Block Co., Ltd., Osaka (JP)

(72) Inventor: Hyakutaro Kobayashi, Osaka (JP)

(73) Assignee: Nippon Pillow Block Co., Ltd., Osaka (JP)

( * ) Notice: Subject to any disclaimer, the term of this patent is extended or adjusted under 35 U.S.C. 154(b) by 0 days.

(21) Appl. No.: 14/256,014

(22) Filed: Apr. 18, 2014

(30) Foreign Application Priority Data

Dec. 20, 2013 (JP) .................................. 2013-263829

(51) Int. Cl.
F16C 35/02 (2006.01)
F16C 35/063 (2006.01)

(52) U.S. Cl.
CPC .............. *F16C 35/02* (2013.01); *F16C 35/063* (2013.01)
USPC ........................................ 384/538; 384/540

(58) Field of Classification Search
USPC ................................ 384/538, 540, 542; 403/370
See application file for complete search history.

(56) References Cited

U.S. PATENT DOCUMENTS

| | | | | |
|---|---|---|---|---|
| 2,118,891 A | * | 5/1938 | Marino | 384/538 |
| 2,168,469 A | * | 8/1939 | Brouwer | 384/538 |
| 4,012,154 A | * | 3/1977 | Durwin et al. | 384/542 |

FOREIGN PATENT DOCUMENTS

JP 2006-009967 A 1/2006

OTHER PUBLICATIONS

Japanese Industrial Standard, Section B, 1558: 2009, including a front cover and the relevant pp. 2 and 4 thereof, along with English translations of the front cover and the relevant portions (shown translated into English and highlighted in corresponding boxes).

* cited by examiner

*Primary Examiner* — Thomas R. Hannon
(74) *Attorney, Agent, or Firm* — Bacon & Thomas, PLLC (57) ABSTRACT

A male thread portion and a taper portion are provided in an outer periphery of an extension portion of an inner ring of a bearing, discission portions are formed in the taper portion at uniform intervals in a peripheral direction, female thread holes for fixing bolts are provided at uniform intervals in a peripheral direction, from a side surface, in a fixing nut which is threadably provided in the male thread portion, and bolt insertion holes and female thread holes are formed in a fixing collar which is fitted to the taper portion in the outer periphery of the extension portion in a taper portion in an inner periphery, the bolt insertion holes corresponding to the female thread holes of the fixing nuts from a side surface, and the female thread holes being provided for detaching bolts at uniform intervals in the peripheral direction.

9 Claims, 5 Drawing Sheets

ATTACHING STRUCTURE OF BEARING TO SHAFT

BACKGROUND OF THE INVENTION

1. Field of the Invention

The present invention relates to a structure, for example, for attaching and fixing an inner ring (an inner race) of a bearing to a rotating shaft (hereinafter, refer to as a shaft).

2. Description of the Conventional Art

As means for attaching and fixing a bearing to a shaft, several means have been conventionally proposed. For example, the following means have been proposed.

i) An inner ring is pressed on the basis of deformation of a conical collar (sleeve) by fastening a locking screw which is threadably provided in the collar, whereby a bearing is attached and fixed to a bearing.

ii) A taper surface in an inner periphery of a bearing is brought into close contact with a taper surface in an outer periphery of a sleeve by fastening a lock nut of an adapter sleeve, whereby the bearing is attached and fixed to a shaft.

PRIOR ART DOCUMENT

Non-Patent Document

Non-Patent Document 1: a) Structure described as "3.4 Bearing with Conical Fixed Wheel" in page 2 and "FIG. 2—Bearing with Conical Fixed Wheel (UM Type)" in page 4, JIS, B-1558:2009, which employs the collar and the locking screw mentioned in the item 1) mentioned above.

Non-Patent Document 2: b) Structure described as "FIG. 5—Tapered Hole Bearing (UK Type)" in page 4, JIS, B-1558:2009, which employs the taper surface mentioned in the item ii) mentioned above.

Patent Document

Patent Document 1: Japanese Unexamined Patent Publication No. 2006-9967

The structure described in this document utilized the taper surface in the same manner as the item ii) mentioned above, however, an end surface of a bearing inner ring is pressed with a leading end surface of a bolt by fastening a lock nut and threadably providing a bolt in two or more through holes formed in the nut, and the bearing is attached and fixed on the basis of movement of the bearing to a large-diameter side on a taper of an adapter sleeve which is set in the shaft.

SUMMARY OF THE INVENTION

Problem to be Solved by the Invention

However, the prior arts have the following problems.

First of all, in the structure described in the item i) of the non-patent document mentioned above, the bearing is attached and fixed to the shaft only by fastening the locking screw which is attached to the conical collar, however, misalignment of shaft centers of the both is increased. Further, since the attachment and fixation of the both by the locking screw is carried out only from one side of the bearing, an opposite side comes to a floating state due to a gap between the inner ring and the shaft. Accordingly, the structure has an aspect that the structure is hard to be used in a high-speed rotation and a rotation with high precision. Further, a scratch such as a burr is generated in the periphery of the shaft by fastening the locking screw, and there is generated a problem that the shaft is hard to be disconnected when the bearing is detached.

Next, in the structure described in the non-patent document ii) mentioned above, since the bearing is attached and fixed to the shaft by using the adapter such as the sleeve, the lock nut, and the washer, the misalignment of the shaft centers becomes smaller as is different from the structure in the item i) mentioned above. However, since the sleeve pulls the inner ring of the bearing at the fastening time of the lock nut, there is a risk that displacement of a rolling position is generated in an inner portion of the bearing. Therefore, a skill is required in the attaching and fixing work.

The structure described in the patent document 1 mentioned above relates to a nut with pressing function, however, a relationship between a taper in an inner periphery of an inner ring and a taper in an outer periphery of an adapter sleeve is necessarily inverted between the case that the bearing is attached to the shaft and the case that the bearing is detached from the shaft. As a result, the nut with pressing function and the adapter sleeve can correspond only to one of the attaching time and the detaching time.

Further, since the inner ring is pressed and fixed to the larger-diameter side of the taper in the adapter sleeve in the case that the bearing is attached to the shaft, there is a risk that a bearing function is affected by reduction of the gap in the inner portion of the bearing.

The present invention relates to an attaching structure of a bearing to a shaft, and aims at dissolving the problems in the conventional means mentioned above. In other words, an object of the present invention is to provide an attaching structure of a bearing to a shaft which is small in misalignment between shaft centers of the shaft and the bearing, is hard to be deviated in a rolling position in an inner portion of the bearing, hardly scratches a surface of the shaft, can comparatively easily carry out an attaching and fixing work, can correspond to both of attachment and detachment, and does not reduce a gap in the inner portion of the bearing.

Means for Solving the Problem

An attaching structure of a bearing to a shaft according to the present invention is structured such that a male thread portion 6 and a taper portion 7 are provided in an outer periphery of an extension portion 4 of an inner ring 3 of a bearing 2, and discission portions 8 are formed in the taper portion 7 at uniform intervals in a peripheral direction, female thread holes 12 for fixing bolts 13 are provided at uniform intervals in a peripheral direction, from a side surface of a fixing nut 9 which is threadably provided in the male thread portion 6, bolt insertion holes 17 and female thread holes 18 are formed in a fixing collar 14 which is fitted to the taper portion 7 in the outer periphery of the extension portion 4 in a taper portion 15 in an inner periphery, the bolt insertion holes 17 corresponding to the female thread holes 12 of the fixing nuts 9 from a side surface, and the female thread holes 18 being provided for detaching bolts 19 at uniform intervals in the peripheral direction, and the fixing bolts 13 are threadably engaged with and fastened to the female thread holes 12 of the fixing nut 9 from the bolt insertion holes 17 of the fixing collar 14 in the case that the bearing 2 is attached and fixed to the shaft 1, and the fixing bolts 13 are detached, the detaching bolts 19 are thereafter threadably engaged with the female thread holes 18 of the fixing collar 14, and the bearing 2 can be detached from the shaft 1 by pressing the side surface 11 of the fixing nut 9 with a leading end portion of the detaching bolt 19, in the case that the bearing 2 is detached from the shaft 1.

In the structure mentioned above, the extension portion 4 to the side direction of the inner ring 3 is not limited to the above structure in which the extension portion 4 is formed in one side of the inner ring 3 (for example, refer to FIG. 1), but the extension portion 4 may be formed in both sides of the inner ring 3 so as to provide the same structure mentioned above (for example, refer to FIG. 5). Further, the fixing bolt 13 may be used as the detaching bolt 19, however, the fixing bolt 13 and the detaching bolt 19 may employ the independent bolts.

Effect of the Invention

According to the attaching structure of the bearing to the shaft having the structure mentioned above, the following operations and effects are provided.

1) The work for attaching and fixing the bearing 2 to the shaft 1 and detaching the bearing 2 from the shaft 1 can be easily and rapidly carried out without particular skill.

First of all, in the case that the bearing 2 is attached and fixed to the shaft 1, the fixing nut 9 is threadably installed to the male thread portion 6 which is formed in the extension portion 4 of the inner ring 3 in the bearing 2, to a position where the fixing nut 9 stops by a step portion 5. Next, the fixing collar 14 is fitted to the taper portion 7 in the inner ring 3 side by the taper portion 15 in the inner periphery. The position in the peripheral direction is adjusted so that each of the bolt insertion holes 17 of the fixing collar 14 aligns with each of the female thread holes 12 of the fixing nut 9 at this time. Further, the bearing 2 is fitted to a predetermined position on the shaft 1, and the fixing bolt 13 is threadably engaged with each of the female thread holes 12 of the fixing nut 9 from each of the bolt insertion holes 17 of the fixing collar 14 in this state, and is uniformly fastened.

On the basis of the fastening, there acts a force by which the fixing collar 14 is pushed to the fixing nut 9 side, that is, the fixing collar 14 is pulled to the fixing nut side (for example, refer to an arrow F in FIG. 3), and the taper portion 15 of the fixing collar 14 runs on the taper portion 7 in the inner ring 3 side so as to be fitted. Accordingly, since there acts a force by which the taper portion 7 in the inner ring 3 side is pushed in an inner diameter side (for example, refer to an arrow f in FIG. 3), a plurality of discission portions 8 formed in the taper portion 7 are throttled, and the bearing 2 is attached and fixed to the shaft 1.

Next, in the case that the bearing 2 is detached from the shaft 1, each of the fixing bolts 13 is loosened and detached, and the detaching bolt 19 is threadably engaged with each of the female thread holes 18 for detaching which are formed in the side surface of the fixing collar 14 so as to be fastened.

Figure 4:
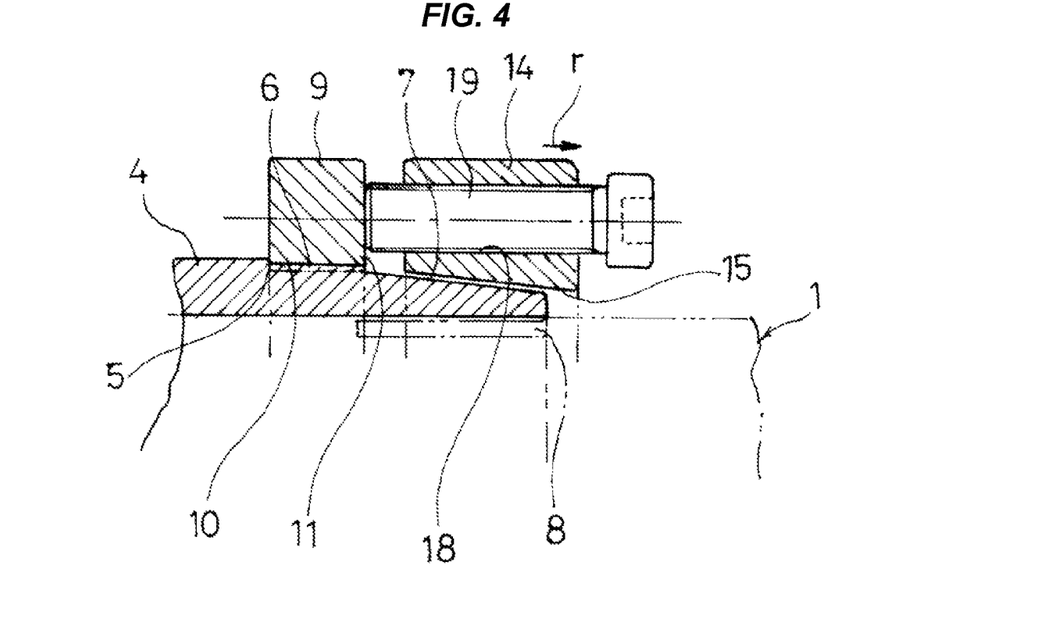
FIG. 4 is a vertical cross section front elevational view of a substantial part which is vertically cut at a position of a female thread hole for detaching, in the embodiment shown in FIG. 1.

Accordingly, the leading end portion of the detaching bolt 19 presses the side surface 11 of the fixing nut 9, and there acts a force which pushes out the fixing collar 14 in a side end direction (for example, a rightward direction in FIG. 4) of the inner ring extension portion 4 (refer to an arrow r in the drawing). As a result, since the force which throttles the discission portion 8 of the taper portion 7 in the extension portion 4 is released, the bearing 2 can move in an axial direction, and the bearing 2 can be easily detached.

2) According to the attaching structure of the bearing to the shaft in the present structure, it is possible to hold down the misalignment of the shaft centers between both the elements 1 and 2 in the case that the bearing 2 is attached to the shaft 1.

Since a plurality of discission portions 8 which are formed in the taper portion 7 of the extension portion 4 at the uniform intervals in the peripheral direction are uniformly throttled in an axial direction as mentioned above, in the case that the bearing 2 is attached to the shaft 1, the bearing 2 is attached and fixed to the shaft 1. As a result, it is possible to extremely hold down the misalignment of the shaft centers between the bearing 2 and the shaft 1.

3) In the same manner, the displacement of the rolling position in the inner portion of the bearing can be done away in the case that the bearing 2 is attached and fixed to the shaft 1 as mentioned above.

In other words, the work for attaching and fixing the bearing 2 to the shaft 1 is carried out by pulling the fixing collar 14 to the fixing nut 9 side on the basis of the fastening of the fixing bolt 13. Since the inner ring 3 of the bearing 2 does not move in the axial direction, the displacement of the rolling position in the inner portion of the bearing 2 is done away during the attaching work. Accordingly, the attaching work is easily carried out in this regard, and it is possible to easily and rapidly carry out the attaching and fixing work.

4) In the same manner, in the case that the bearing 2 is attached and fixed to the shaft 1, it is possible to reduce the scratch applied to the periphery of the shaft 1.

As mentioned above, the work for attaching and fixing the bearing 2 to the shaft 1 is carried out by throttling the discission portion 8 of the taper portion 7 in the inner ring extension portion 4 in the axial direction on the basis of the fastening of the fixing bolt 13. As a result, it is possible to reduce the scuff mark applied to the periphery of the shaft 1.

5) According to the attaching structure of the bearing to the shaft in the present structure, it is possible to correspond to both the works at the attaching and fixing time and at the detaching time, and the gap in the inner portion of the bearing is not reduced.

In other words, the present structure is constructed by combining the inner ring 3, the fixing nut 9 and the fixing collar 14. In the prior art (Japanese Unexamined Patent Publication No. 2006-9967), the structure of the prior art can be used only for the attaching and fixing time or the detaching time, however, the present structure can be used for the detaching work in an untouched state as well as the attaching and fixing work of the bearing 2 to the shaft 1.

Further, as is different from the prior art mentioned above, since the bearing 2 is attached and fixed to the shaft 1 by throttling the discission portion 8 of the taper portion 7 in the inner ring extension portion 4 in the axial direction, the internal gap of the bearing 2 is not reduced by the attaching and fixing, and it is possible to do away with fear that the performance of the bearing is adversely affected.

MODE FOR CARRYING OUT THE INVENTION

A male thread portion 6 and a taper portion 7 are provided in an outer periphery of an extension portion 4 of an inner ring 3 of a bearing 2, discission portions 8 are provided in the taper portion 7 at uniform intervals in a peripheral direction, female thread holes 12 for fixing bolts 13 are formed in a side surface of a fixing nut 9 threadably installed to the male thread portion 6 at uniform intervals in a peripheral direction, and bolt insertion holes 17 and female thread holes 18 are formed in a side end surface of a fixing collar 14 at uniform intervals in a peripheral direction, the fixing collar 14 being fitted to the taper portion 7 in the outer periphery of the extension portion 4 by a taper portion 15 in an inner periphery, the bolt insertion holes 17 corresponding to the female thread holes 12 of the fixing nut 9, and the female thread holes 18 being provided for detaching bolts 19. Accordingly, the fixing bolts 13 are threadably engaged with the female thread holes 12 of the fixing nut 9 from the bolt insertion holes 17 of the fixing collar 14 so as to be fastened, at the attaching and fixing time of the bearing 2 to the shaft 1, and the detaching bolts 19 are threadably engaged with the female thread holes 18 of the fixing collar 14 so as to press the side surface 11 of the fixing nut 9 by the leading end portion of the detaching bolt 19, and pushes out the fixing collar 14 in the side end direction of the inner ring extension portion 4, at the detaching time of the bearing 2 from the shaft 1.

DETAILED DESCRIPTION OF PREFERRED EMBODIMENTS

Embodiment 1

FIGS. 1 to 4 and FIGS. 6 and 7 show a first embodiment of an attaching structure of a bearing to a shaft according to the present invention.

Figure 1:
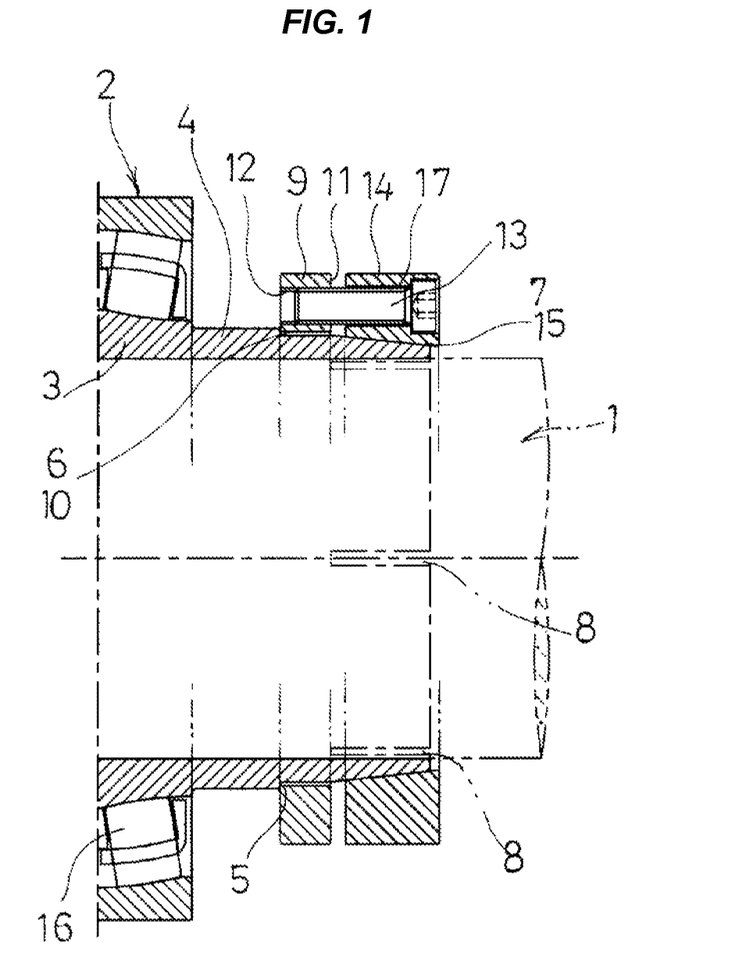
FIG. 1 is a partly omitted vertical cross section front elevational view of a first embodiment according to the present invention.
Figure 2:
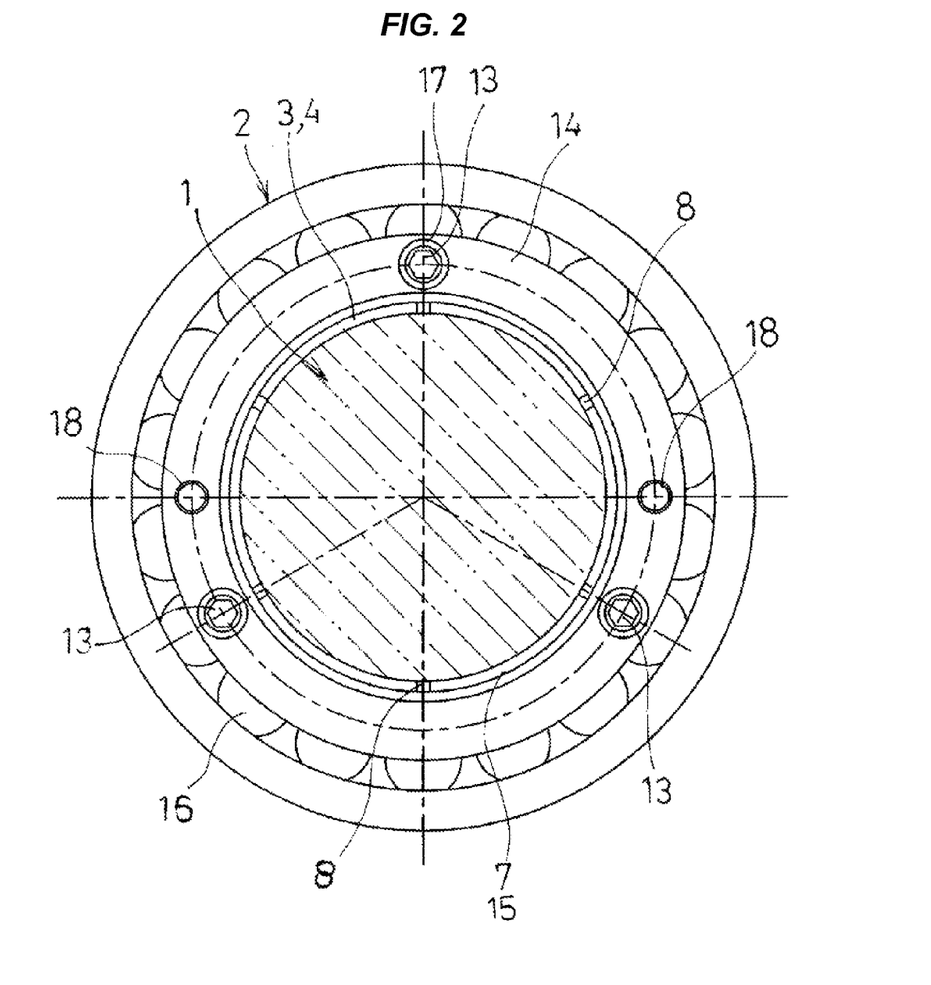
FIG. 2 is a partly vertical cross section right side elevational view of the embodiment shown in FIG. 1.

Reference numeral 1 denotes a shaft, and reference numeral 2 denotes a bearing which is attached and fixed to the shaft 1. An extension portion 4 extending to a side direction is formed in an inner ring 3 of the bearing 2, and a male thread portion 6 is formed in the inner ring 3 of the bearing 2 via a step portion 5 which is formed in an outer periphery close to the bearing 2 of the extension portion 4.

Further, a taper portion 7 having a smaller diameter toward its leading end is formed in the extension portion 4 in succession to the male thread portion 6, and discission portions 8 in an axial direction are formed in the taper portion 7 at uniform intervals, here at six positions, in a peripheral direction.

Reference numeral 9 denotes a fixing nut. A female thread portion 10 is formed in an inner periphery of the fixing nut 9, and can be threadably installed to the male thread portion 6 of the inner ring extension portion 4. Further, female thread holes 12 are formed from a side surface of the fixing nut 9 at uniform intervals, here at three positions, in a peripheral direction, and can threadably engage fixing bolts 13.

Reference numeral 14 denotes a fixing collar. A taper portion 15 is formed in an inner periphery of the fixing collar 14 and corresponds to the taper portion 7 in the outer periphery of the inner ring extension portion 4. The taper portion 15 can be fitted to the taper portion 7 in the outer periphery of the extension portion 4. Further, female thread holes 18 passing through for the detaching bolts 19 are formed from a side surface of the fixing collar 14 at uniform intervals, here at two positions, in a peripheral direction, and bolt insertion holes 17 passing through for the fixing bolts 13 are formed in correspondence to the female thread holes 12 of the fixing nut 9.

Further, in the case that the bearing 2 is attached and fixed to the shaft 1, the bearing 2 is fitted to a predetermined position of the shaft 1, the fixing nut 9 is threadably engaged with the male thread portion 6 formed in the inner ring extension portion 4 of the bearing 2 to the step portion 5 by the female thread portion 10 in the inner periphery, and the fixing collar 14 is thereafter fitted to the taper portion 7 closer to the side end side than the male thread portion 6 by the taper portion 15 in the inner periphery, as mentioned above. Next, the fixing bolt 13 is threadably engaged with each of the female thread holes 12 of the fixing nut 9 from each of the bolt insertion holes 17 of the fixing collar 14 so as to be uniformly fastened.

Figure 3:
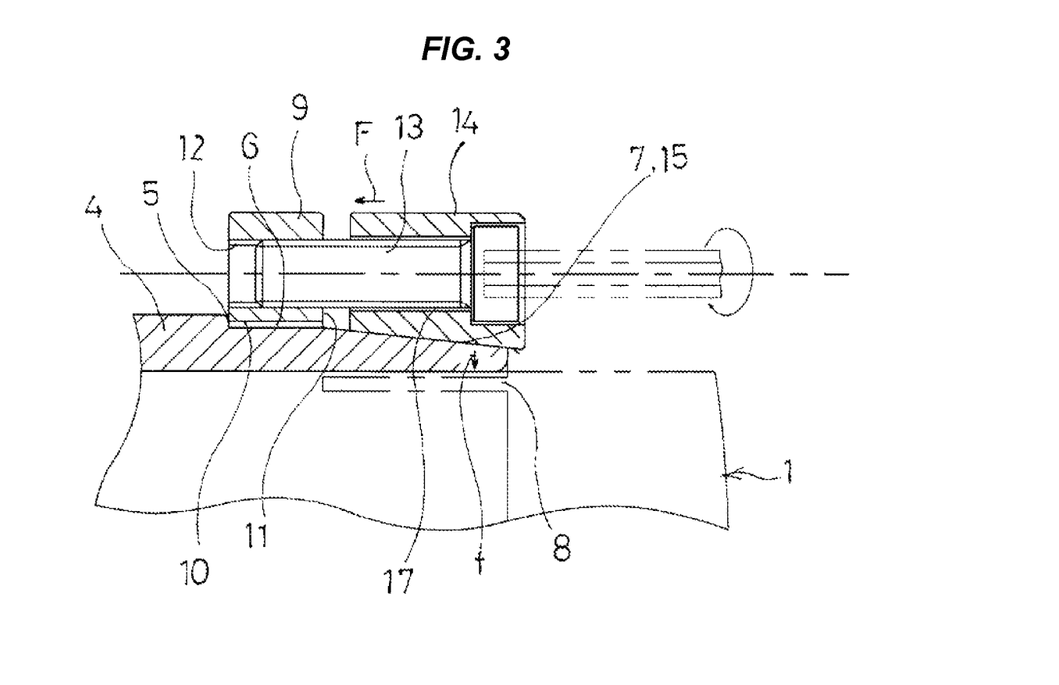
FIG. 3 is a vertical cross section front elevational view of a substantial part of the embodiment shown in FIG. 1.

As a result, a force as shown by an arrow F in FIG. 3 acts on the fixing collar 14, and the taper portion 15 in the inner periphery of the fixing collar 14 runs on the taper portion 7 in the outer periphery of the inner ring extension portion 4 so as to be fitted. Accordingly, since each of the discission portions 8 formed in the taper portion 7 of the inner ring extension portion 4 is exposed to the force shown by an arrow f in FIG. 3 so as to be fastened in an axial direction, the bearing 2 is attached and fixed onto the shaft 1.

On the other hand, in the case that the bearing 2 is detached from the shaft 1, each of the fixing bolts 13 is previously loosened and detached, and the detaching bolt 19 is threadably engaged with the female thread hole 18 for detaching of the fixing collar 14 and is fastened. Accordingly, the leading end portion of the detaching bolt 19 presses the side surface 11 of the fixing nut 9, a force shown by an arrow r in FIG. 4 acts on the fixing collar 14, and the fixing collar 14 is pushed out in a side end direction of the inner ring extension portion 4 (a rightward direction of the drawing). As a result, since the fixing collar 14 is detached from the taper portion 7 of the inner ring extension portion 4, and the discission portions 8 are not exposed to the throttling force, the bearing 2 can move on the shaft 1 and can be detached.

The materials of the fixing nut 9 and the fixing collar 14 are here carbon steels for machine structural use S17C, and the materials of the fixing bolt 13 and the detaching bolt 19 are chrome molybdenum steels SCM435. Further, a plating treatment is applied here to the fixing collar 14 and the fixing nut 9, and the bolts 13 and 19 employ bolts to which ferrosofemic oxide coating treatment is applied.

Since the operations and effects together with the attaching and fixing work and the detaching work are the same as those described in detail in the previous section of the effect of the invention, a description thereof will be omitted here. Further, the illustrated example shows an example in which the present invention is applied to a spherical roller bearing, however, it goes without saying that the present invention can be employed in the other bearings.

Embodiment 2

Figure 5:
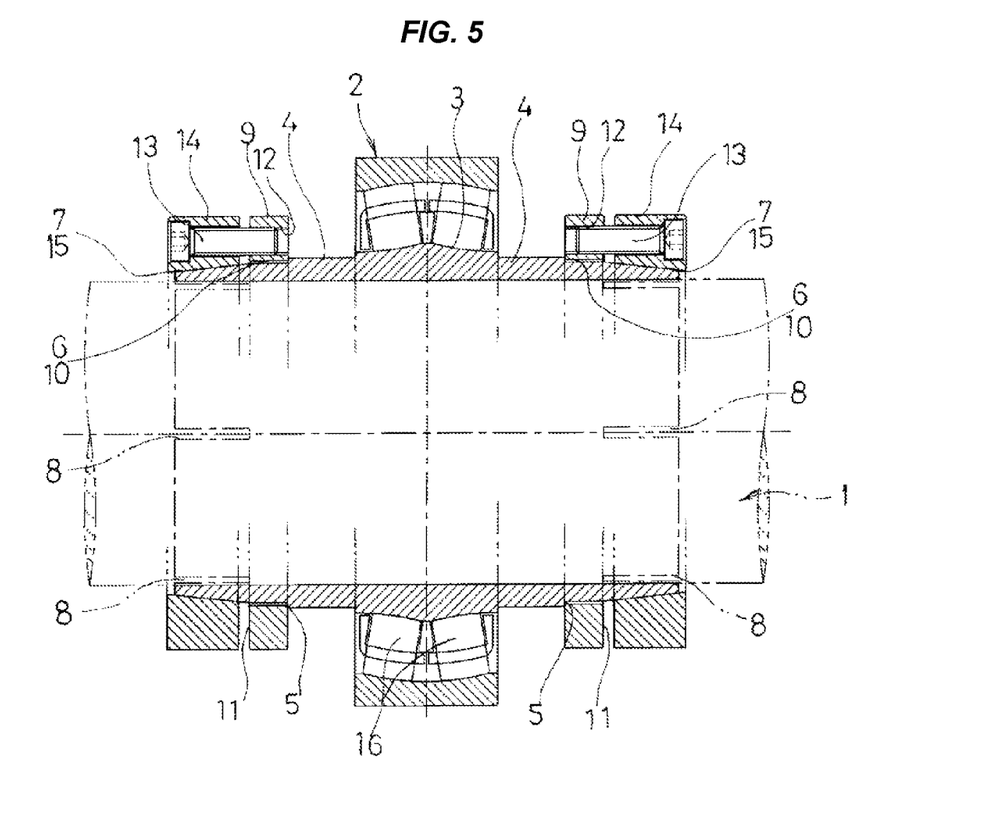
FIG. 5 is a partly omitted vertical cross section front elevational view of a second embodiment according to the present invention.
Figure 6:
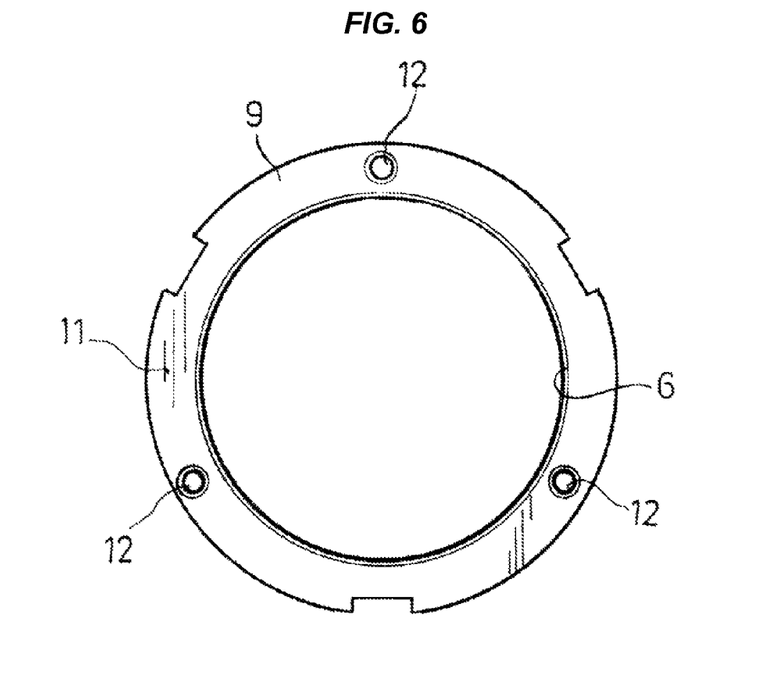
FIG. 6 is a side elevational view of a fixing nut which is used in the embodiment shown in FIG. 1.
Figure 7:
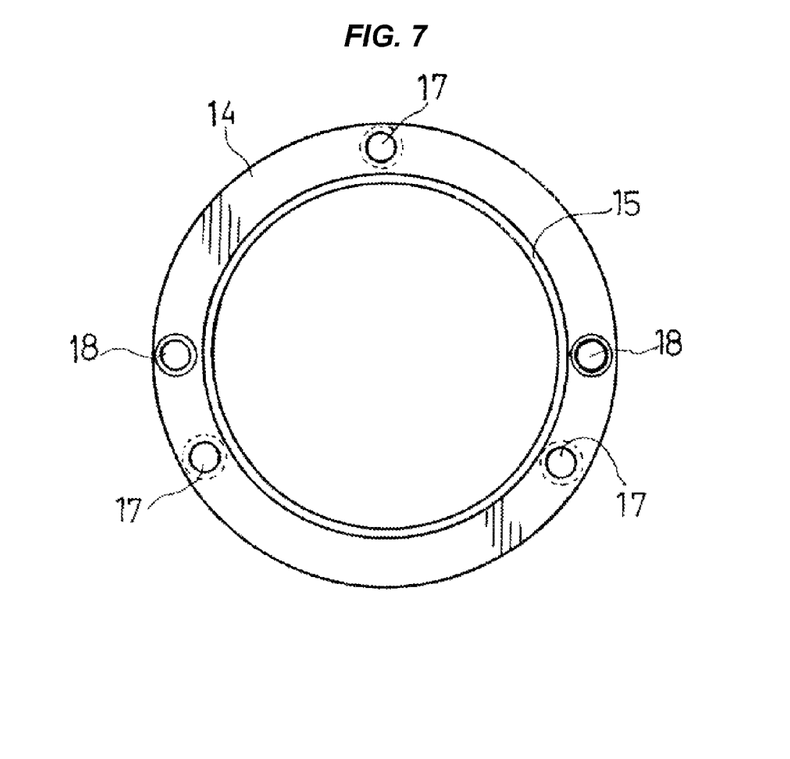
FIG. 7 is a side elevational view of the fixing nut which is used in the embodiment shown in FIG. 1.

FIG. 5 shows a second embodiment, and is a case that the attaching and fixing of the bearing 2 to the shaft 1 is carried out in both sides, and the operations mentioned in the embodiment 1 mentioned above is carried out in both sides of the bearing 2. Therefore, details of the second embodiment will be omitted here and an outline thereof will be described.

The extension portion 4 is formed in both sides of the inner ring 3 of the bearing 2, the male thread portion 6 and the taper portion 7 are formed in the outer periphery of each of the extension portions 4, and the discission portions 8 are formed in each of the taper portions 7 at six positions at uniform intervals in the peripheral direction.

The extension portion 4 is formed in both sides of the inner ring 3 of the bearing 2, the male thread portion 6 and the taper portion 7 are formed in an outer periphery of each of the extension portions 4, and the discission portions 8 are formed at six positions in each of the taper portions 7 at the uniform intervals in the peripheral direction.

Reference 9 denotes a fixing nut. The fixing nut 9 has in its inner surface a female thread portion 10 which is threadably installed to the male thread portion 6, and female thread holes 12 for the fixing bolts are formed at the uniform intervals from a side surface of each of the fixing nuts 9 in a peripheral direction.

Reference numeral 14 denotes a fixing collar 14. The fixing collar 14 has its inner periphery a taper portion 15 which can be fitted in correspondence to the taper portion 7 in the outer periphery of the extension portion 4 of the inner ring 3 mentioned above. Bolt insertion holes 17 and female thread holes 18 are formed in correspondence to the female thread holes 12 of the fixing nuts 9 from a side surface of the fixing collar 14, the bolt insertion holes 17 being formed at the uniform intervals in the peripheral direction, and the female thread holes 18 being formed for a detaching bolt 19 at the uniform intervals, two positions here in the peripheral direction in the same manner. In addition, reference numeral 16 denotes rollers of the bearing 2.

The operations and effects in the case that the bearing 2 is fixed to the shaft 1 and detached from the shaft 1 are approximately the same as the points mentioned in the embodiment 1, and a description thereof will be omitted here.

INDUSTRIAL APPLICABILITY

In the case that the bearing 2 is attached and fixed to the shaft 1, it is possible to easily and rapidly carry out the work without necessity of particular skill, it is possible to reduce the misalignment of the shaft centers between the shaft 1 and the bearing 2, the rolling position is hard to be deviated in the inner portion of the bearing 2, the periphery of the shaft 1 is not scratched, and the present invention is greatly useful in the case that both of the attaching and fixing and the detaching are intended to be carried out.

What is claimed is:

1. An attaching structure of a bearing to a shaft,
    wherein a male thread portion and a taper portion are provided in an outer periphery of an extension portion of an inner ring of a bearing, and discission portions are formed in said taper portion at uniform intervals in a peripheral direction,
    wherein female thread holes for fixing bolts are provided at uniform intervals in a peripheral direction, from a side surface of a fixing nut which is threadably provided in said male thread portion,
    wherein bolt insertion holes and female thread holes are formed in a fixing collar which is fitted to the taper portion in the outer periphery of the extension portion in a taper portion in an inner periphery, the bolt insertion holes corresponding to the female thread holes of the fixing nuts, and the female thread holes being provided for detaching bolts at uniform intervals in the peripheral direction from the side surface, and
    wherein the fixing bolts are threadably engaged with and fastened to the female thread holes of the fixing nut from the bolt insertion holes of the fixing collar in the case that the bearing is attached and fixed to the shaft, and the detaching bolts are threadably engaged with the female thread holes of the fixing collar, and the bearing can be detached from the shaft by pressing the side surface of the fixing nut with a leading end portion of the detaching bolt, in the case that the bearing is detached from the shaft.

2. The attaching structure of the bearing to the shaft according to claim 1, wherein the detaching bolt is used as the fixing bolt.

3. The attaching structure of the bearing to the shaft according to claim 1, wherein the detaching bolt is independent from the fixing bolt.

4. An attaching structure of a bearing to a shaft,
    wherein a male thread portion and a taper portion are provided in an outer periphery of an extension portion formed in one side of an inner ring of a bearing, and discission portions are formed in said taper portion at uniform intervals in a peripheral direction,
    wherein female thread holes for fixing bolts are provided at uniform intervals in a peripheral direction, from a side surface of a fixing nut which is threadably provided in said male thread portion,
    wherein bolt insertion holes and female thread holes are formed in a fixing collar which is fitted to the taper portion in the outer periphery of the extension portion in a taper portion in an inner periphery, the bolt insertion holes corresponding to the female thread holes of the fixing nuts, and the female thread holes being provided for detaching bolts at uniform intervals in the peripheral direction from the side surface, and
    wherein the fixing bolts are threadably engaged with and fastened to the female thread holes of the fixing nut from the bolt insertion holes of the fixing collar in the case that the bearing is attached and fixed to the shaft, and the detaching bolts are threadably engaged with the female thread holes of the fixing collar, and the bearing can be detached from the shaft by pressing the side surface of the fixing nut with a leading end portion of the detaching bolt, in the case that the bearing is detached from the shaft.

5. The attaching structure of the bearing to the shaft according to claim 4, wherein the detaching bolt is used as the fixing bolt.

6. The attaching structure of the bearing to the shaft according to claim 4, wherein the detaching bolt is independent from the fixing bolt.

7. An attaching structure of a bearing to a shaft,
    wherein a male thread portion and a taper portion are provided in an outer periphery of each of extension portions formed in both sides of an inner ring of a bearing, and discission portions are formed in each of said taper portions at uniform intervals in a peripheral direction,
    wherein female thread holes for fixing bolts are provided at uniform intervals in a peripheral direction, from a side surface of each of fixing nuts which are threadably provided respectively in said male thread portions,
    wherein bolt insertion holes and female thread holes 18 are formed in each of fixing collars which are respectively fitted to the taper portions in the outer periphery of the extension portions in respective taper portions in an inner periphery, the bolt insertion holes corresponding to the female thread holes of the fixing nuts, and the female thread holes being provided for detaching bolts at uniform intervals in the peripheral direction from the side surface, and
    wherein the fixing bolts are threadably engaged with and fastened to the female thread holes of each of the fixing nuts from the bolt insertion holes of each of the fixing collars in the case that the bearing is attached and fixed to the shaft, and the detaching bolts are threadably engaged with the female thread holes of each of the fixing collars, and the bearing can be detached from the shaft by pressing the side surface of each of the fixing nuts with a leading end portion of each of the detaching bolts, in the case that the bearing is detached from the shaft.

8. The attaching structure of the bearing to the shaft according to claim 7, wherein the detaching bolt is used as the fixing bolt.

9. The attaching structure of the bearing to the shaft according to claim 7, wherein the detaching bolt is independent from the fixing bolt.

* * * * *